United States Patent
Kusumoto et al.

(10) Patent No.: US 6,922,443 B1
(45) Date of Patent: Jul. 26, 2005

(54) SIGNAL TRANSMISSION CIRCUIT

(75) Inventors: Keiichi Kusumoto, Hyogo (JP);
Toshiyuki Moriwaki, Osaka (JP);
Tsuguyasu Hatsuda, Osaka (JP);
Tetsurou Toubou, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 875 days.

(21) Appl. No.: 09/712,247

(22) Filed: Nov. 15, 2000

(30) Foreign Application Priority Data

Nov. 16, 1999 (JP) .......................................... 11-325062

(51) Int. Cl.[7] ................................................ H04B 3/00
(52) U.S. Cl. ..................... 375/259; 375/220; 375/257
(58) Field of Search ................... 375/257, 259,
375/219, 220, 356, 377; 326/28, 82, 83,
86, 87, 93, 95, 98; 327/108; 333/24 R

(56) References Cited

U.S. PATENT DOCUMENTS

| | | | |
|---|---|---|---|
| 4,630,284 A | * 12/1986 | Cooperman | 375/257 |
| 4,964,141 A | 10/1990 | Matsushima et al. | 375/354 |
| 5,355,391 A | 10/1994 | Horowitz et al. | 375/257 |
| 5,654,653 A | 8/1997 | Coyle et al. | |
| 5,661,417 A | 8/1997 | Kondoh | |
| 5,859,546 A | 1/1999 | Yamauchi | 326/93 |
| 6,025,794 A | 2/2000 | Kusumoto et al. | 341/172 |

FOREIGN PATENT DOCUMENTS

| | | |
|---|---|---|
| JP | 2-285711 | 11/1990 |
| JP | 3-64118 | 3/1991 |
| JP | 4-150615 | 5/1992 |
| JP | 4-159690 | 6/1992 |
| JP | 9-130250 | 5/1997 |
| JP | 9-190693 | 7/1997 |
| JP | 10-134581 | 5/1998 |
| JP | 10-190465 | 7/1998 |
| JP | 11-195966 | 7/1999 |

* cited by examiner

*Primary Examiner*—Khai Tran
*Assistant Examiner*—David B. Lugo
(74) *Attorney, Agent, or Firm*—McDermott Will & Emery LLP

(57) ABSTRACT

A signal is transmitted in synchronization with a clock signal that repeats H and L levels indicating a preparation period and a transmission period, respectively. A transmitting circuit includes a transmitting capacitor, an input switch for setting a voltage in accordance with an input digital signal in the transmitting capacitor at preparation period, and a transmitting switch for generating a small voltage change in the signal line at transmission period, the voltage change being in accordance with a voltage of the transmitting capacitor. A receiving circuit includes an inverter with a CMOS configuration, a receiving capacitor inserted between an input terminal and an output terminal of the inverter, an equalizing switch for short-circuiting the input terminal and the output terminal of the inverter so as to set the voltage of the signal line to a predetermined voltage at preparation period, and a latch for supplying an output digital signal by performing logic amplification of the voltage of the output terminal of the inverter for each transmission period, and for holding the output for each preparation period.

10 Claims, 11 Drawing Sheets

SIGNAL TRANSMISSION CIRCUIT

BACKGROUND OF THE INVENTION

The present invention relates to a design technique for digital circuits. In particular, the present invention relates to a technique for speeding up signal transmission and a technique for reducing power consumption of the circuits.

In the current multimedia era, there is a demand for higher speed operational performance in fixed equipment, and lower power consumption in portable equipment. With these trends, a demand for high speed and low power consumption of semiconductor integrated circuits has become increasingly strong. On the other hand, under the promotion of miniaturization in the semiconductor process and multilayering of wiring, parasitic devices in wiring significantly affect the design. For example, an increase of the wiring resistance value and the wiring inductance value due to a reduction of the thickness of films for metal wiring and an increase of the wiring capacitance value due to a reduction of wiring pitch tend to prevent the achievement of high speed semiconductor integrated circuits and low power consumption.

Japanese Laid-Open Patent Publication No. 2-285711 discloses a signal transmission circuit for transmitting digital signals. In this signal transmission circuit, in order to realize high-speed driving of the signal line having a large load capacity, the voltage of a signal line is set to an intermediate voltage between a logic high voltage (Vdd) and a logic low voltage (Vss), and the signal line is driven to the logic high voltage or the logic low voltage by an inverter.

In this conventional signal transmission circuit, the voltage magnitude of the signal line (assuming Vss=0, the voltage magnitude is Vdd/2) is large. Therefore, it takes a long time to set the voltage of the signal lane to an intermediate voltage, and the power consumption become large.

SUMMARY OF THE INVENTION

In view of the above-mentioned conventional problems, the present invention has been devised for the purpose of realizing high speed transmission and low power consumption in a signal transmission circuit for transmitting digital signals via a signal line having a large load capacity.

In order to achieve this purpose, the signal transmission circuit of the present invention is directed to reducing the voltage magnitude of the signal line by achieving efficient transfer of charges between a transmitting capacitor and a receiving capacitor in a synchronous or asynchronous signal transmission circuit.

More specifically, a first signal transmission circuit of the present invention is a synchronous signal transmission circuit for transmitting a digital signal from a first circuit block to a second circuit block via a signal line in synchronization with a clock signal that repeats a first logic level indicating a preparation period and a second logic level indicating a transmission period. The first circuit block includes a transmitting circuit including a transmitting capacitor, an input switch setting a voltage in accordance with a logic level of a supplied input digital signal in the transmitting capacitor at each preparation period, and a transmitting switch for generating a small voltage change in the signal line at each transmission period, the voltage change being in accordance with the voltage of the transmitting capacitor that is set during the preceding preparation period. The second circuit block includes a receiving circuit including an inverter connected to the signal line, a receiving capacitor inserted between an input terminal and an output terminal of the inverter, an equalizing switch for short-circuiting the input terminal and the output terminal of the inverter so as to set the voltage of the signal line to a predetermined voltage at each preparation period, and a latch for supplying an output digital signal obtained by performing logic amplification of the voltage of the output terminal of the inverter for each transmission period and holding the output digital signal obtained during the preceding transmission period for each preparation period.

Furthermore, a second signal transmission circuit of the present invention is an asynchronous signal transmission circuit for transmitting a digital signal from a first circuit block to a second circuit block via a signal line. The first circuit block includes a transmitting circuit including a transition detection circuit for sequentially detecting a transition of the logic level of a supplied input digital signal so as to detect a high level period during which a logic high level is output to the signal line, and a low level period during which a logic low level is output to the signal line, first and second transmitting capacitors, a precharge switch for setting a predetermined logic high voltage in the first transmitting capacitor at each low level period, a first transmitting switch for generating a small voltage change in the signal line at each high-level period, the voltage change being in accordance with the voltage of the first transmitting capacitor that is set during the preceding low level period, a predischarge switch for setting a predetermined logic low voltage in the second transmitting capacitor at each high level period, and a second transmitting switch for generating a small voltage change in the signal line at each low level period, the voltage change being in accordance with the voltage of the second transmitting capacitor that is set during the preceding high level period. The second circuit block includes a receiving circuit including an inverter for amplifying a small voltage change in the signal line, a receiving capacitor inserted between an input terminal and an output terminal of the inverter, an equalizing switch inserted between the input terminal and the output terminal of the inverter, a first level circuit for supplying a first detection signal when a small positive voltage change in the signal line is detected from the voltage of the output terminal of the inverter, a second level circuit for supplying a second detection signal when a small negative voltage change in the signal line is detected from the voltage of the output terminal of the inverter, an output circuit for supplying an output digital signal having a logic level in accordance with a logic level of the input digital signal, in accordance with the first and second detection signals, and an equalizing control circuit for forcing the equalizing switch to be on for a certain period after the first detection signal or the second detection signal is supplied so as to set the voltage of the signal line to a predetermined voltage.

This and other advantages of the present invention will become apparent to those skilled in the art upon reading and understanding the following detailed description with reference to the accompanying figures.

DETAILED DESCRIPTION OF THE INVENTION

Hereinafter, the embodiments of the present invention will be described with reference to the accompanying drawings.

Figure 1:
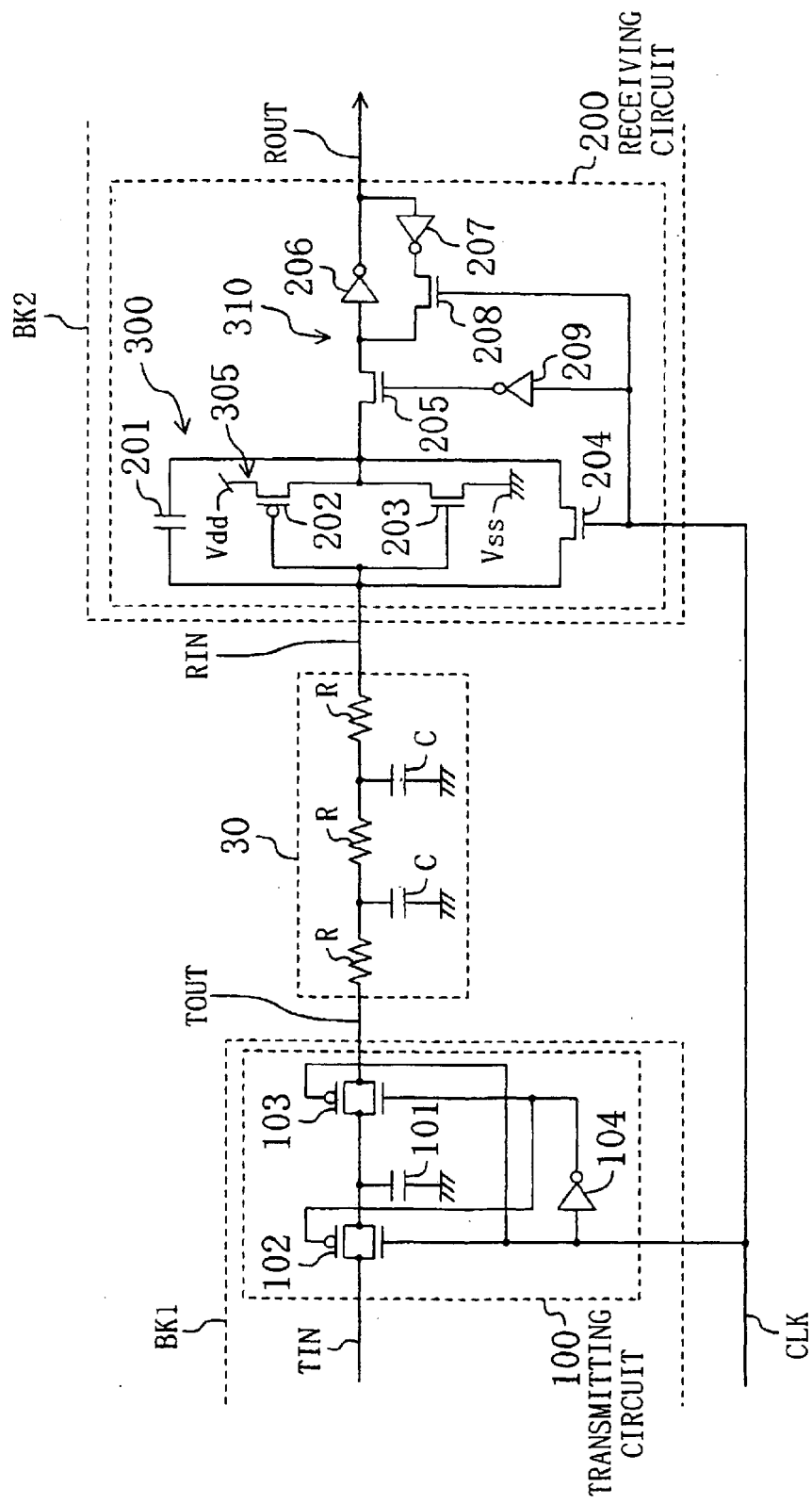
FIG. 1 is a circuit diagram illustrating an example of the configuration of a synchronous signal transmission circuit of the present invention.

FIG. 1 shows an example of the configuration of a synchronous signal transmission circuit of the present invention. The signal transmission circuit in FIG. 1 is a circuit for transmitting digital signals from a first circuit block BK1 to a second circuit block BK2 via a signal line 30 in synchronization with a clock (CLK) signal. The circuit blocks BK1 and BK2 may be in the same semiconductor integrated circuit or in different semiconductor integrated circuits. The signal line 30 is shown in FIG. 1 by an equivalent circuit of a combination of a wiring resistance R and a wiring capacitance C. In the description below, the logic high level (H level) and the logic low level (L level) of a CLK signal represent a preparation period and a transmission period, respectively. Herein, the preparation period refers to a period for preparing signal transmission, and the transmission period refers to a period for performing signal transmission.

The first circuit block BK1 includes a transmitting a circuit 100 having an input terminal TIN for receiving a digital signal to be transmitted from the internal portion of the circuit block BK1 and an output terminal TOUT connected to the signal line 30. The transmitting circuit 100 includes a transmitting capacitor 101, an input switch 102, a transmitting switch 103 and an inverter 104. The input switch 102 is turned on so as to supply an input digital signal to the transmitting capacitor 101 for each preparation period (a period of CLK=H) and is turned off for each transmission period (a period of CLK=L). In other words, at each preparation period, the voltage in accordance with the logic level of a supplied digital signal is set in the transmitting capacitor 101. The transmitting switch 103 is turned on so as to connect the transmitting capacitor 101 to the signal line 30 for each transmission period (a period of CLK=L) and is turned off for each preparation period (a period of CLK=H). In other words, at each transmission period, a small voltage change in accordance with the voltage of the transmitting capacitor 101 set during the preceding preparation period occurs in the signal line 30.

The second circuit block BK2 includes a receiving circuit 200 having an input terminal RIN connected to the signal line 30 and an output terminal ROUT for supplying a received digital signal to the internal portion of the circuit block BK2. The receiving circuit 200 includes an amplifier circuit 300 including a CMOS inverter 305, and a latch 310. Reference numeral 201 denotes a receiving capacitor and reference numeral 204 denotes an equalizing switch. The inverter 305 includes a p-channel MOS transistor 202 and an n-channel MOS transistor 203 that are inserted between a Vdd power line and a Vss power line, and the input terminal thereof is connected to the signal line 30. The receiving capacitor 201 and the equalizing switch 204 are inserted between the input terminal and the output terminal of the inverter 305. The equalizing switch 204 is turned on so as to short-circuit the input terminal and the output terminal of the inverter 305 for each preparation period (a period of CLK=H), and is turned off for each transmission period (a period of CLK=L) so as to allow the operation of the inverter 305 for amplifying a small voltage change in the signal line 30 to charge and discharge the receiving capacitor 201. The equalizing switch 204 is turned on for each preparation period, so that each voltage of the signal line 30 and the input terminal and the output terminal of the inverter 305 is set to a predetermined equalized voltage Veq at each preparation period. Herein, Veq is a voltage determined by the input/output characteristics of the inverter 305. The latch 310 includes, for example two switches 205 and 208 and three inverters 206, 207 and 209, so as to supply an output digital signal obtained by performing logic amplification of the voltage of the output terminal of the inverter 305 for each transmission period (a period of CLK=L) and hold the output digital signal obtained during the preceding transmission period for each preparation period (a period of CLK=H). The receiving capacitor 201 may be realized by a parasitic capacitance between the gate and the drain of each of the transistors 202 and 203 constituting the CMOS inverter 305.

According to the signal transmission circuit in FIG. 1, the equalizing switch 204 in the receiving circuit 200 functions to set the voltage of the signal line 30 to an equalized voltage Veq. When focusing on a given preparation period, in this period, charges in an amount corresponding to the logic level of the input digital signal supplied to the transmitting circuit 100 are accumulated in the transmitting capacitor 101. The voltage of the signal line 30 in the next transmission period changes by $+\Delta V$ or $-\Delta V$ from the equalized voltage Veq depending on the amount of the charge accumulated in the transmitting capacitor 101 during the previous preparation period. Herein, $\Delta V$ is a voltage magnitude smaller than the voltage magnitude (Vdd/2)of the signal line of the conventional example. In other words, the configuration of FIG. 1 can realize high-speed transmission and low power consumption because the input digital signal is converted to a signal with a small amplitude on the signal line 30.

When the voltage gain of the inverter 305 is represented by G (=−5 to −1000), the input capacitance value of the receiving circuit 200 on the side of the input terminal RIN is (1−G)times the actual capacitance value of the receiving capacitor 201. Therefore, the input capacitance value of the receiving circuit 200 can be significantly larger than the capacitance value of the transmitting capacitor 101 or the total value of the wiring capacitance C. Therefore, almost all the charges supplied from the transmitting capacitor 101 to the signal line 30 during each transmission period transfers to the receiving capacitor 201.

The capacitance value of the transmitting capacitor 101 is set to a small value. The time constant of the charge and the discharge of the transmitting circuit 100 during the transmission period is significantly small, because the time constant is determined by the product of the capacitance value of the transmitting capacitor 101 and the on resistance value of the transmitting switch 103. Therefore, charges rapidly transfer from the transmitting capacitor 101 to the receiving capacitor 201. Moreover, since the energy of the transmission signal is small, reflection of the signal hardly occurs, even if an inductance component is contained in the signal line 30. In addition, since the capacitance value of the transmitting capacitor 101 is small, there is little influence of the power supply inductance and the wiring inductance.

The transmitting circuit 100 and the receiving circuit 200 in FIG. 1 can be regarded as constituting a master slave flip flop. In other words, a long wire (signal line 30) is disposed between a master latch (transmitting circuit 100) and a slave latch (receiving circuit 200). Thus, in this case, power consumption can be reduced, compared with the case where the long wire is driven by an inverter. It is possible to connect a plurality of receiving circuits 200 to the signal line 30.

Figure 2:
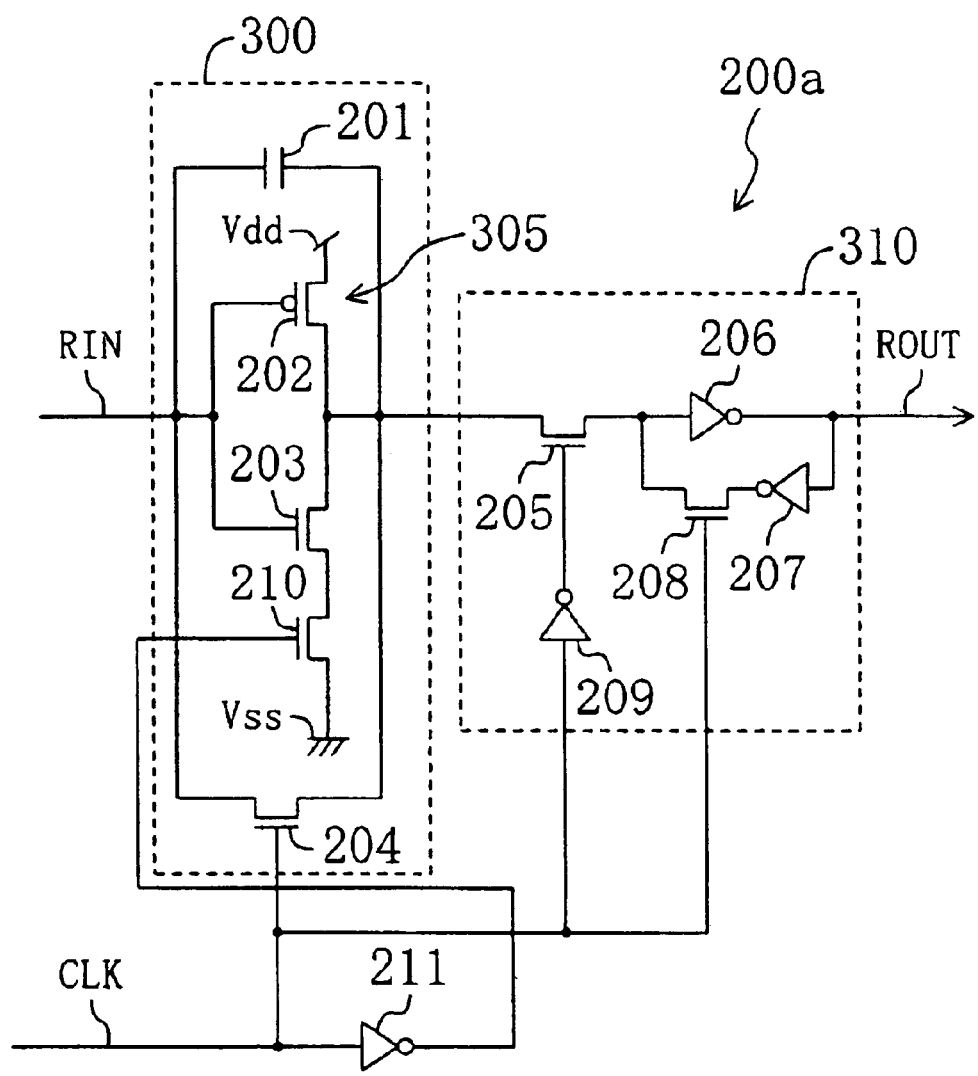
FIG. 2 is a circuit diagram illustrating a variation of the receiving circuit in FIG. 1.

FIG. 2 shows a variation of the receiving circuit 200 in FIG. 1. The receiving circuit 200a in FIG. 2 includes a cut-off switch 210 for separating the CMOS inverter 305 from the Vss power line after the CMOS inverter 305 completes setting the equalized voltage Veq at each preparation period (a period of CLK=H). An inverter 211 in FIG. 2 constitutes a delay circuit for delaying the CLK signal.

When the equalizing switch 204 is turned on at each preparation period, the input terminal and the output terminal of the CMOS inverter 305 are short-circuited. As a result, the voltages of the input terminal and the output terminal are set to a predetermined equalized voltage Veq (assuming Vss=0, Veq=Vdd/2 for example). In this state, since both the p-channel MOS transistor 202 and the n-channel MOS transistor 203 which constitute the CMOS inverter 305 have been turned on, a through-current flows from the Vdd power line to the Vss power line through the CMOS inverter 305. This through-current is unnecessary after the equalized voltage Veq is completed to be set. Therefore, after a predetermined period of time has passed since the rise transition time of a CLK signal, the cut-off switch 210 cuts off the through-current of the CMOS inverter 305. Thus, power consumption of the receiving circuit 200a is reduced.

Figure 3:
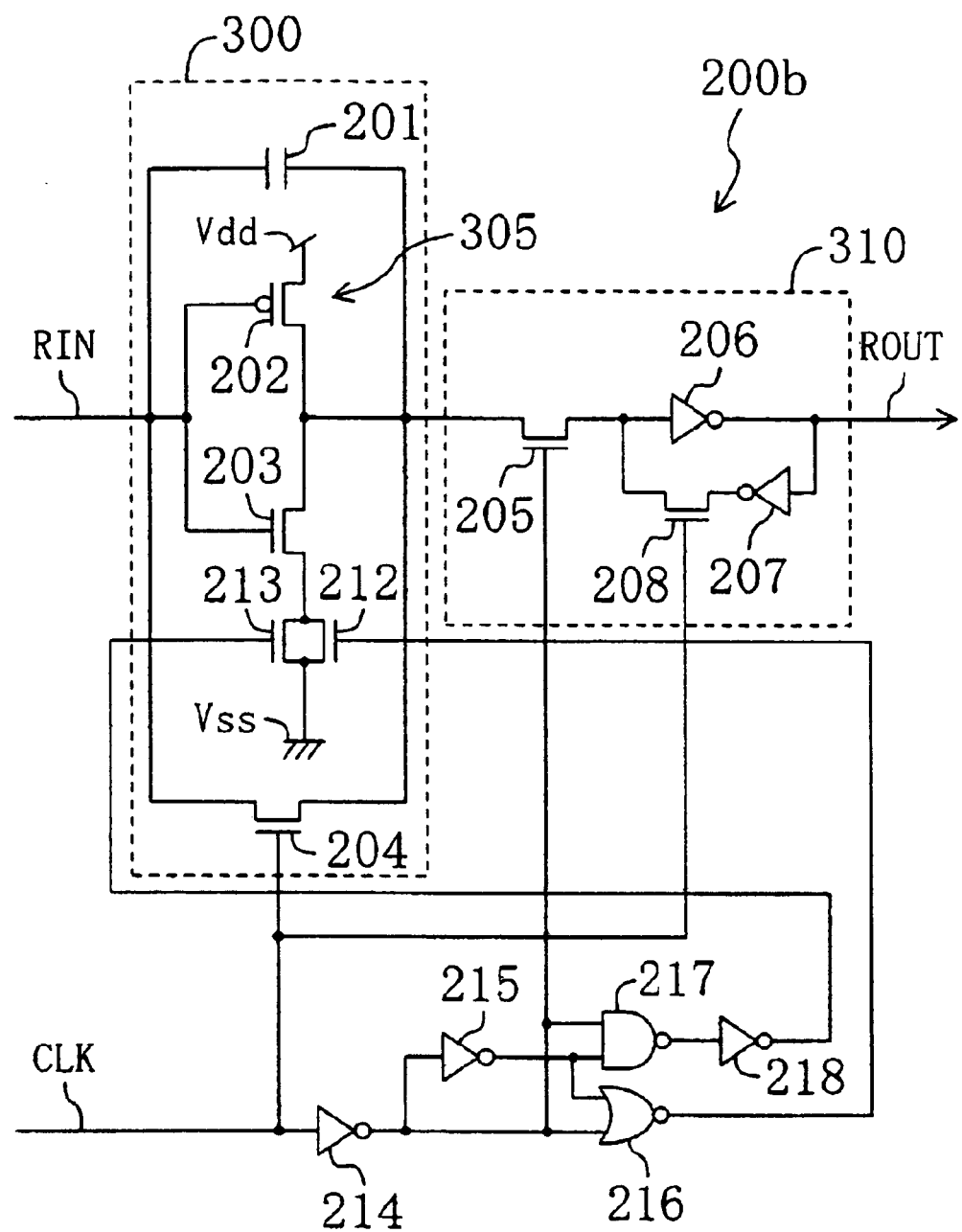
FIG. 3 is a circuit diagram illustrating another variation of the receiving circuit in FIG. 1.

FIG. 3 shows another variation of the receiving circuit 200 in FIG. 1. The receiving circuit 200b in FIG. 3 includes a first cut-off switch 212 for separating the CMOS inverter 305 from the Vss power line after the CMOS inverter 305 completes setting the equalized voltage Veq at each preparation period (a period of CLK=H) and a second cut-off switch 213 for separating the CMOS inverter 305 from the Vss power line after the voltage of the output terminal of the CMOS inverter 305 is established at each transmission period (a period of CLK=L). Signals for controlling the first and second cut-off switch 212 and 213 are generated from CLK signals by three inverters 214, 215 and 218, a NOR gate 216 and a NAND gate 217.

The first cut-off switch 212 cuts off the through-current of the CMOS inverter 305 after a predetermined period of time has passed since the rise transition time of a CLK signal in each preparation period, as the cut-off switch 210 in FIG. 2.

According to FIG. 3, when the equalizing switch 204 is turned off in each transmission period, the CMOS inverter 305 amplifies a small voltage change in the input terminal RIN. The voltage of the input terminal RIN in this case is Veq+ΔV or Veq−ΔV, where ΔV is a small voltage magnitude. In this stage as well, since both the p-channel MOS transistor 202 and the n-channel MOS transistor 203 which constitute the CMOS inverter 305 have been turned on, a through-current flows from the Vdd power line to the Vss power line through the CMOS inverter 305. This through-current is unnecessary after the voltage of the output terminal of the CMOS inverter 305 is established. Therefore, after a predetermined period of time has passed since the fall transition time of a CLK signal, the second cut-off switch 213 cuts off the through-current of the CMOS inverter 305. Thus, power consumption of the receiving circuit 200b is reduced further. In addition, resistance against noise mixed from the Vdd power line and the Vss power line in each transmission period can be improved.

Figure 4:
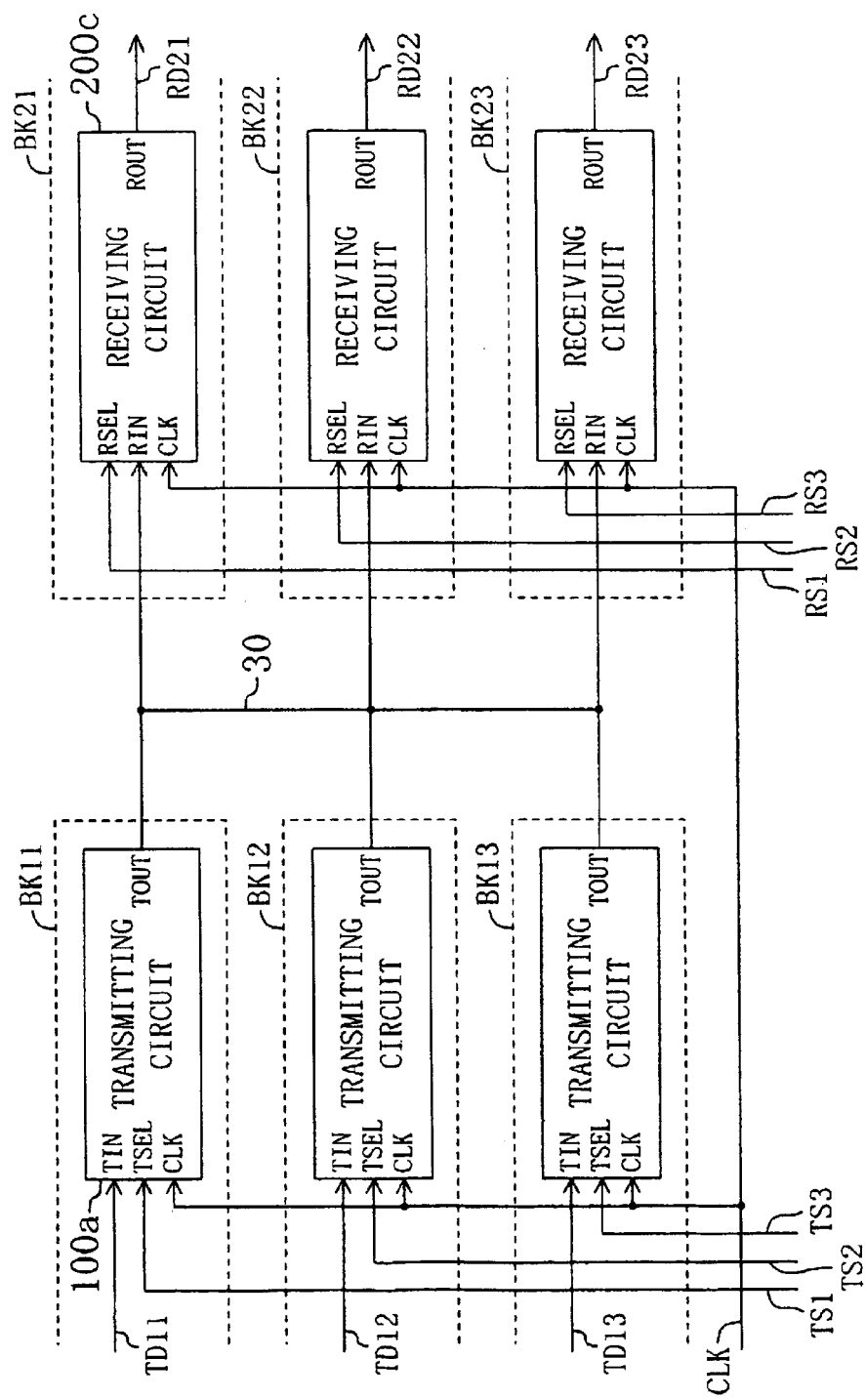
FIG. 4 is a block diagram illustrating another example of the configuration of a synchronous signal transmission circuit of the present invention.

FIG. 4 shows another example of the configuration of a synchronous signal transmission circuit according to the present invention. The signal transmission circuit in FIG. 4 is a signal transmission circuit for transmitting digital signals from either one of a first circuit block group BK11, BK12, and BK13 to either one of a second circuit block group BK21, BK22, and BK23 via a common signal line 30 in synchronization with a clock (CLK) signal. Each of BK11, BK12, and BK13 includes a transmitting circuit 100a with the same configuration, and each of BK21, BK22, and BK23 includes a receiving circuit 200a with the same configuration. Each transmitting circuit 100a of BK11, BK2, and BK13 includes an input terminal TIN for receiving an input digital signal TD11, TD12 or TD13, a selection terminal TSEL for receiving a selection signal TS1, TS2 or TS3, and an output terminal TOUT connected to the signal line 30. Each receiving circuit 200c of BK21, BK22, and BK23 includes an input terminal RIN connected to the signal line 30, a selection terminal RSEL for receiving a selection signal RS1, RS2 or RS3, and an output terminal ROUT for supplying an output digital signal RD21, RD22 or RD23. A common CLK signal is distributed to all the transmitting circuits 100a and all the receiving circuits 200a.

Figure 5:
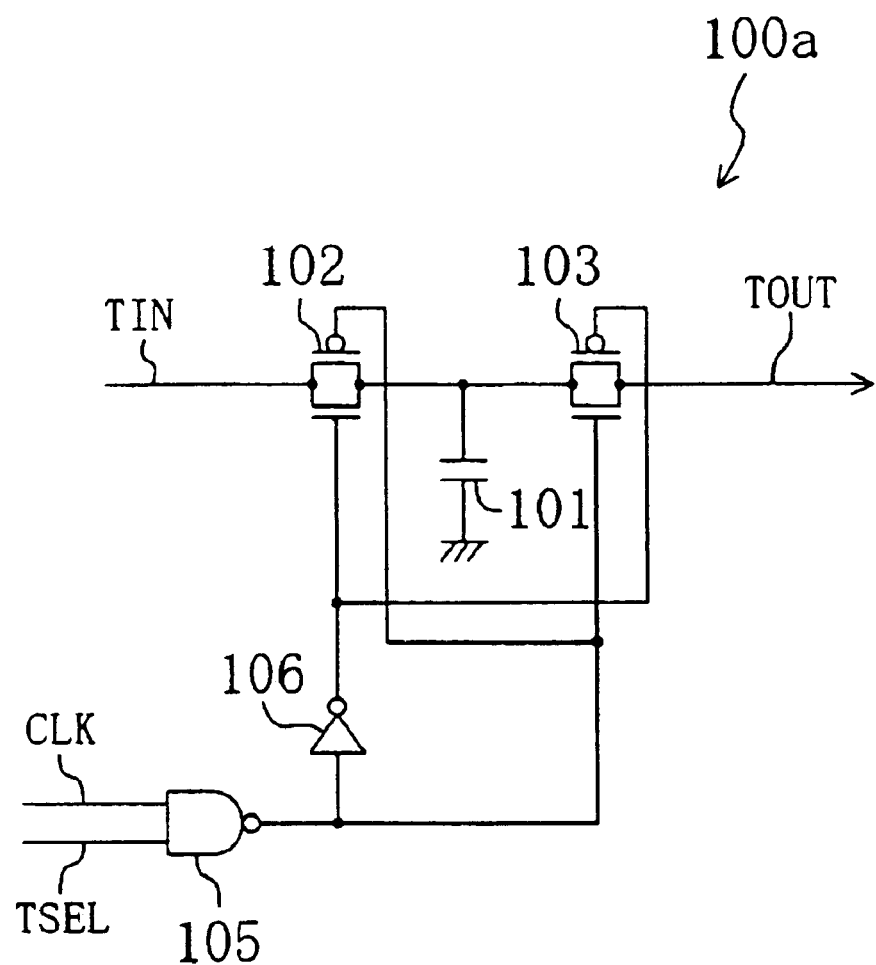
FIG. 5 is a circuit diagram illustrating the internal configuration of the transmitting circuit in FIG. 4.

FIG. 5 shows the internal configuration of the transmitting circuit 100a in FIG. 4. The transmitting circuit 100a in FIG. 5 is different from the transmitting circuit 100 in FIG. 1 in that the former has a logic circuit 105. The logic circuit 105 is a circuit for changing each state of the input switch 102 and the transmitting switch 103 in response to a CLK signal when a selection signal supplied to the selection terminal TSEL is activated (e.g., in the case of TS1=H), and fixing each state of the input switch 102 and the transmitting switch 103 when the selection signal is non-activated (e.g., in the case of TS1=L). Reference numeral 106 in FIG. 5 denotes an inverter for inverting an output from a NAND gate constituting the logic circuit 105. In the example shown in FIG. 5, in the case of non-selection, the input switch 102 is fixed to be off, and the output switch 103 is fixed to be on. However, it is also possible that in the case of non-selection, the input switch 102 is fixed to be on, and the output switch 103 is fixed to be off.

Figure 6:
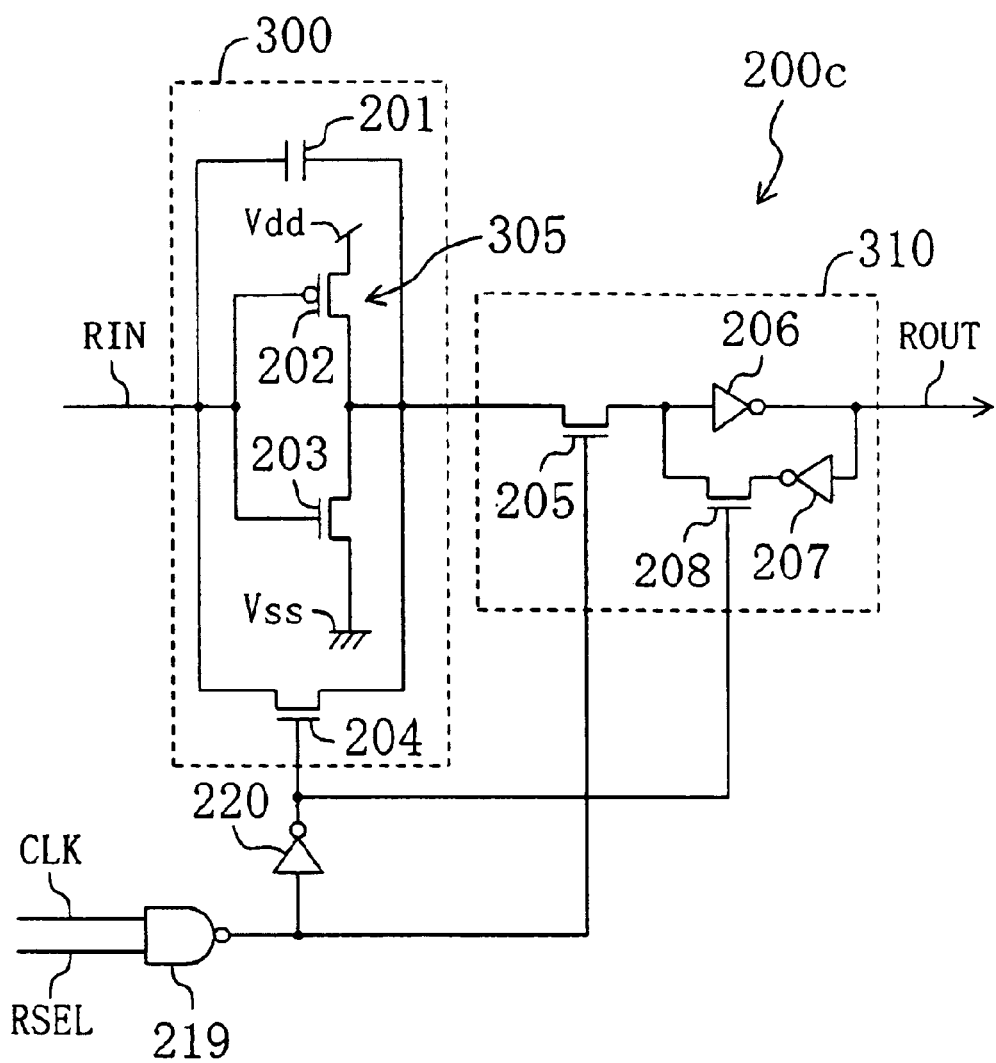
FIG. 6 is a circuit diagram illustrating the internal configuration of the receiving circuit in FIG. 4.

FIG. 6 shows the internal configuration of the receiving circuit 200c in FIG. 4. The receiving circuit 200c in FIG. 6 is different from the transmitting circuit 200 in FIG. 1 in that the former has a logic circuit 219. The logic circuit 219 is a circuit for changing the state of the equalizing switch 204 in response to a CLK signal when a selection signal supplied to the selection terminal RSEL is activated (e.g., in the case of RS1=H), and fixing the state of the equalizing switch 204 to be off when the selection signal is non-activated (e.g., in the case of RS1=L). Reference numeral 220 in FIG. 6 denotes an inverter for inverting an output from a NAND gate constituting the logic circuit 219. In the example shown in FIG. 6, in the case of non-selection, the equalizing switch 204 is fixed to be off, and two switches 205 and 208 of the latch 310 are fixed to be on and to be off, respectively.

According to the signal transmission circuits of FIGS. 4 to 6 a circuit block on the transmission side and a circuit block on the reception side can be designated arbitrarily. For example, when a digital signal is transmitted from BK11 to BK23, TS1=RS3=H and TS2=TS3=RS1=RS2=L are set. At this point, the transmission of signals with a small amplitude can be achieved between the transmitting circuit 100a of BK11 and the receiving circuit. 200c of BK23, as in the case of FIG. 1. In this case, the voltage of the signal line 30 slightly changes from Veq to Veq+ΔV or Veq-ΔV in the signal transmission between any circuit blocks.

Figure 7:
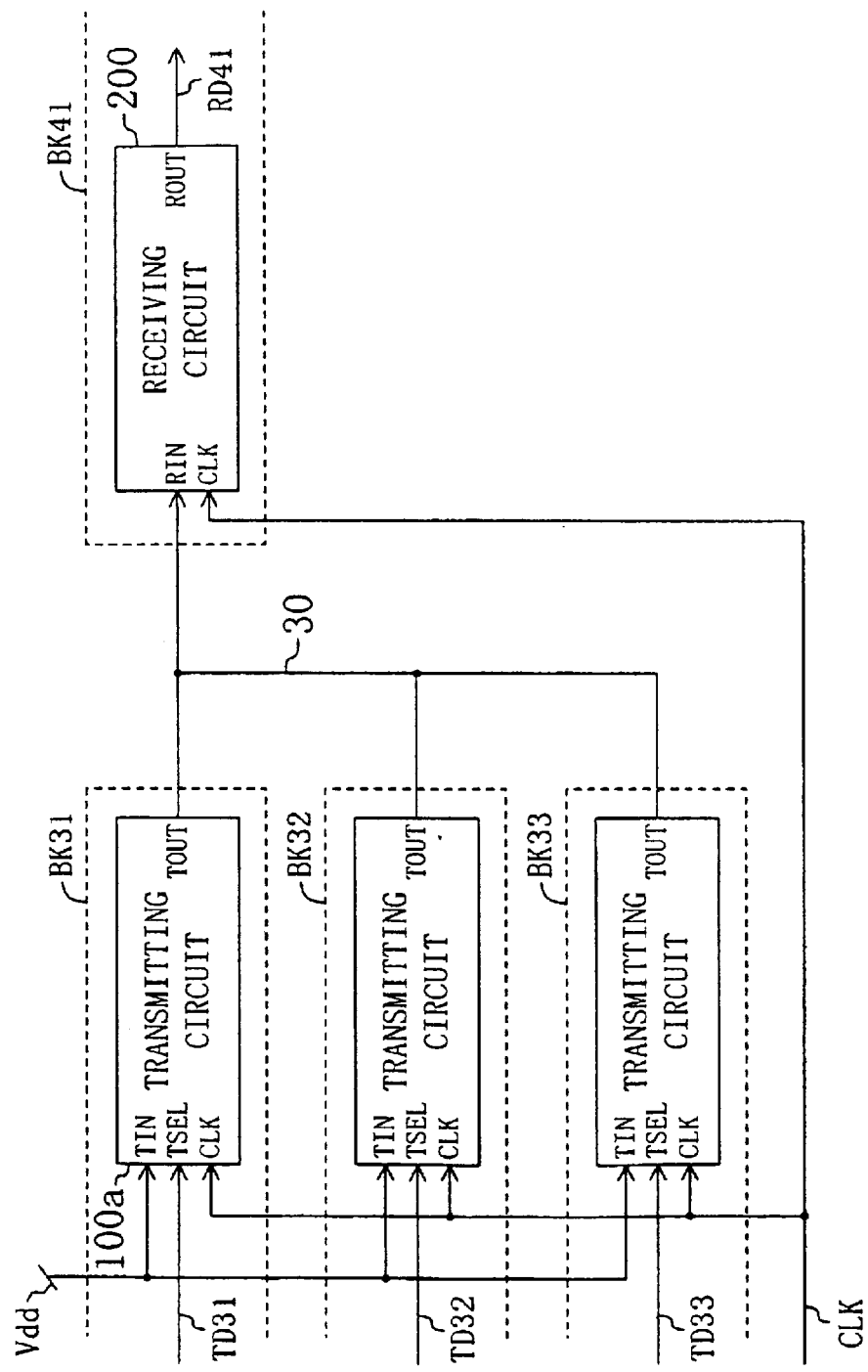
FIG. 7 is a block diagram illustrating still another example of the configuration of a synchronous signal transmission circuit of the present invention.

FIG. 7 shows still another example of the configuration of a synchronous signal transmission circuit according to the present invention. The signal transmission circuit in FIG. 7 is a signal transmission circuit for transmitting a logic operation result from the first circuit block group BK31, BK32, and BK33 to the second circuit block BK41 via a common signal line 30 in synchronization with a clock (CLK) signal, which logic operation result is based on the digital signals TD31, TD32, and TD33 supplied to the first circuit block group BK31, BK32, and BK33, respectively, Each of BK31, BK32, and BK33 includes a transmitting circuit 100a in FIG. 5, and BK41 includes a receiving circuit 200 in FIG. 1. Each transmitting circuit 100a of BK31, BK32, and BK33 is designed so as to receive a corresponding digital signal TD31, TD32, or TD33 at the selection terminal TSEL, and to have an input terminal TIN connected to the Vdd power line. RD41 is an output digital signal representing the logic operation results.

According to the configuration of FIG. 7, the logic circuit 105 (see FIG. 5) in each transmitting circuit 100a changes each state of the input switch 102 and the transmitting switch 103 in response to the CLK signal when an input digital signal supplied to the selection terminal TSEL is activated (e.g., in the case of TD31=H), and fixes each state of the input switch 102 and the transmitting switch 103 when the digital signal is non-activated (e.g., in the case of TD31=L). On the other hand, the voltage of the input terminal TIN of each transmitting circuit 100a is constantly fixed to a logic high voltage (Vdd). Therefore, in the case where one of TD31, TD32, and TD33 is activated, the voltage of the signal line 30 is changed from Veq to Veq+ΔV. In the case where two of TD31, TD32, and TD33 are activated, the voltage of the signal line 30 is changed from Veq to Veq+2 ΔV. In the case where three of TD31, TD32, and TD33 are activated, the voltage of the signal line 30 is changed from Veq to Veq+3ΔV. These voltage changes in the signal line 30 appear as a change from Veq to Veq-GΔV, a change from Veq to Veq-2GΔV, and a change from Veq to Veq-3GΔV at the output terminal of the CMOS inverter 305 (see FIG. 1) in the receiving circuit 200 in FIG. 7. Therefore, assuming that Vth is a logic threshold voltage of the inverter 206 (see FIG. 1)in the latch 310, when Veq<Vth<Veq-GΔV is satisfied, the output digital signal RD41 indicates the result of the OR operation of the three input digital signals TD31, TD32 and TD33. When Veq-GΔV<Vth<Veq-2GΔV is satisfied, the output digital signal RD41 indicates the result of the majority logic operation of the three input digital signals TD31, TD32 and TD33. When Veq-2G ΔV<Vth<Veq-3GΔV is satisfied, the output digital signal RD41 indicates the result of the AND operation of the three input digital signals TD31, TD32 and TD33. It is possible that the voltage of the input terminal TIN of each transmitting circuit 100a is fixed to the logic low voltage (Vss) and the logic threshold voltage of the inverter 206 in the receiving circuit 200 is set to be higher than Veg.

Figure 8:
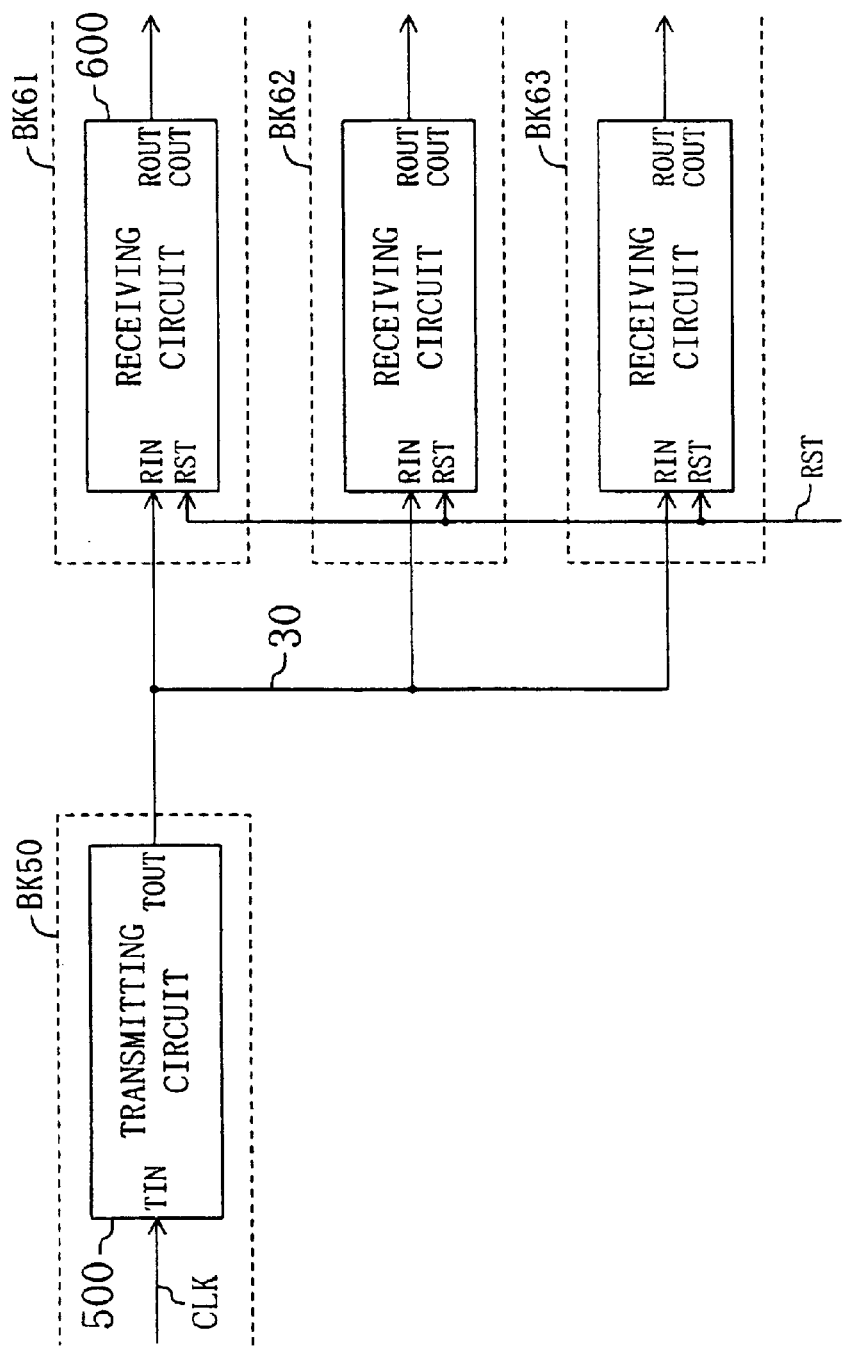
FIG. 8 is a block diagram illustrating an example of the configuration of an asynchronous signal transmission circuit of the present invention.

FIG. 8 shows an example of the configuration of an asynchronous signal transmission circuit according to the present invention. The signal transmission circuit in FIG. 8 is a signal transmission circuit for transmitting and distributing digital signals (clock signals CLK in this example) from a first circuit block BK50 to each of a second circuit block group BK61, BK62, and BK63 via a common signal line 30. These circuit blocks BK50, BK61, BK62, and BK63 can be in the same semiconductor integrated circuit or in different semiconductor integrated circuits.

The first circuit block BK50 includes a transmitting circuit 500 having an input terminal TIN for receiving a clock signal to be transmitted from the internal portion of the circuit block BK50 and an output terminal TOUT connected to the signal line 30. Each of the second circuit blocks BK61, BK62, and BK63 includes a receiving circuit 600 having an input terminal RIN connected to the signal line 30, an output terminal ROUT for supplying a received clock signal to the internal portion of each circuit block, and another input terminal for receiving a reset (RST) signal. A COUT terminal of each receiving circuit 600 will be described later.

Figure 9:
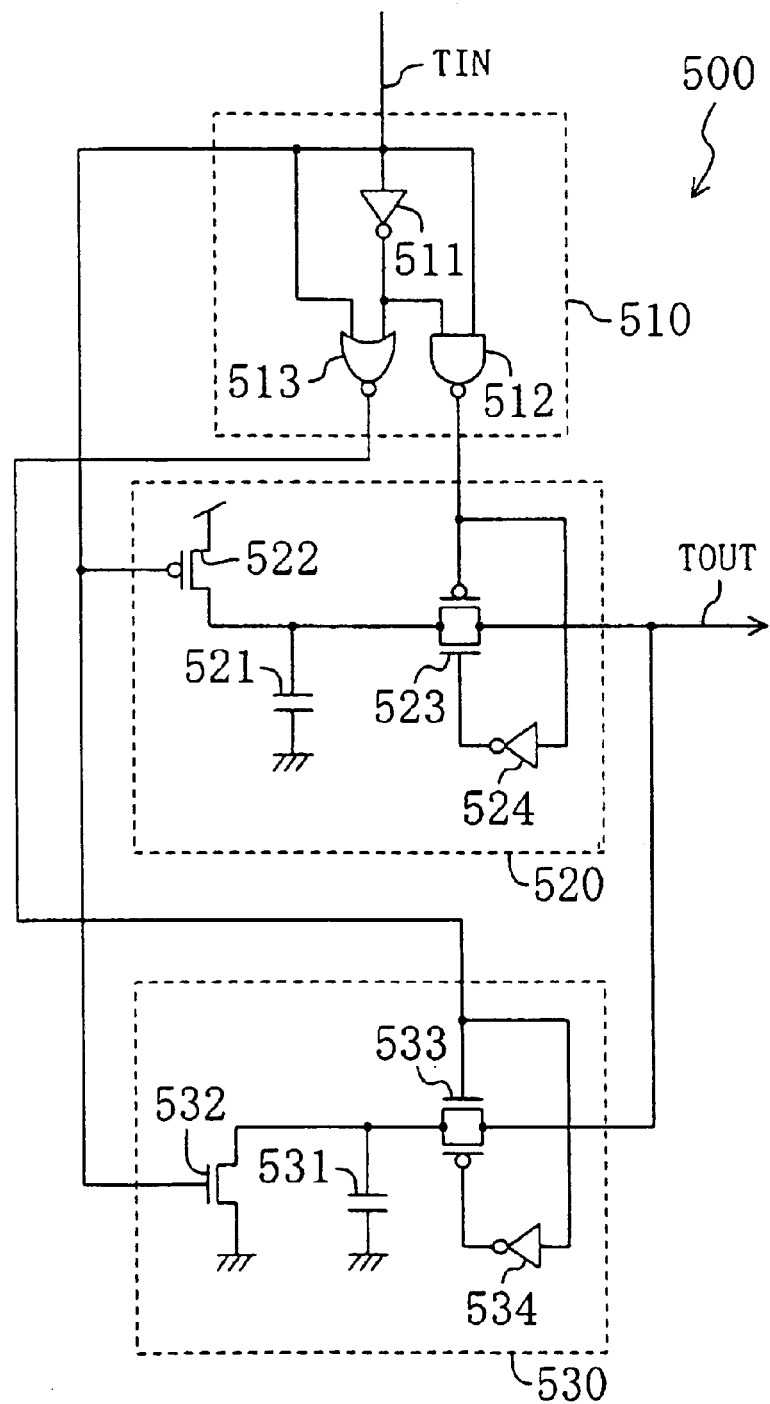
FIG. 9 is a circuit diagram illustrating the internal configuration of the transmitting circuit in FIG. 8.

FIG. 9 shows the internal configuration of the transmitting circuit 500 in FIG. 8. The transmitting circuit 500 in FIG. 9 includes a transition detection circuit 510, a first transmitting capacitor 521, a precharge switch 522, a first transmitting switch 523, a second transmitting capacitor 531, a predischarge switch 532, a second transmitting switch 533, and two inverters 524 and 534.

The transition detection circuit 510 is a circuit for sequentially detecting a transition of the logic level of an input clock (CLK) signal supplied from the input terminal TIN. This circuit includes an inverter 511, a NAND gate 512, and a NOR gate 513 so as to detect a high level period (a period of CLK=H) during which a logic high level is output to the output terminal TOUT and a low level period (a period of CLK=L) during which a logic low level is output to the output terminal TOUT. The output from the NAND gate 512 is at a logic low level by a delay time of the inverter 511 from the rise transition time of the CLK signal, i.e., a predetermined period from the start time of each high level period. The output from the NOR gate 513 is at a logic high level by a delay time of the inverter 511 from the fall transition time of the CLK signal, i.e., a predetermined period from the start time of each low level period.

The first transmitting capacitor 521, the precharge switch 522, the first transmitting switch 523, and the inverter 524 constitute a high level output circuit 520. The precharge switch 522 is turned on so as to supply the logic high voltage of the Vdd power line to the first transmitting capacitor 521 for each low level period (a period of CLK=L) and is turned off for each high level period (a period of CLK=H). In other words, at each low level period, a predetermined logic high voltage is set in the first transmitting capacitor 521. The first transmitting switch 523 is turned on so as to connect the first transmitting capacitor 521 to the output terminal TOUT for a predetermined period from the start time of each high level period (a period of CLK=H). That means that at each high level period, a small positive voltage change in accordance with the voltage of the first transmitting capacitor 521 that has been set during the preceding low level period is generated in the signal line 30.

The second transmitting capacitor 531, the predischarge switch 532, the second transmitting switch 533, and the inverter 534 constitute a low level output circuit 530. The predischarge switch 532 is turned on so as to supply the logic low voltage of the Vss power line to the second transmitting capacitor 531 for each high level period (a period of CLK=H) and is turned of f for each low level period (a period of CLK=L). In other words, at each high level period, a predetermined logic low voltage is set in the second transmitting capacitor 531. The second transmitting switch 533 is turned on so as to connect the second transmitting capacitor 531 to the output terminal TOUT for a predetermined period from the start time of each low level period (a period of CLK=L). That means that at each low level period, a small negative voltage change in accordance with the voltage of the second transmitting capacitor 531 that has been set during the preceding high level period is generated in the signal line 30.

Figure 10:
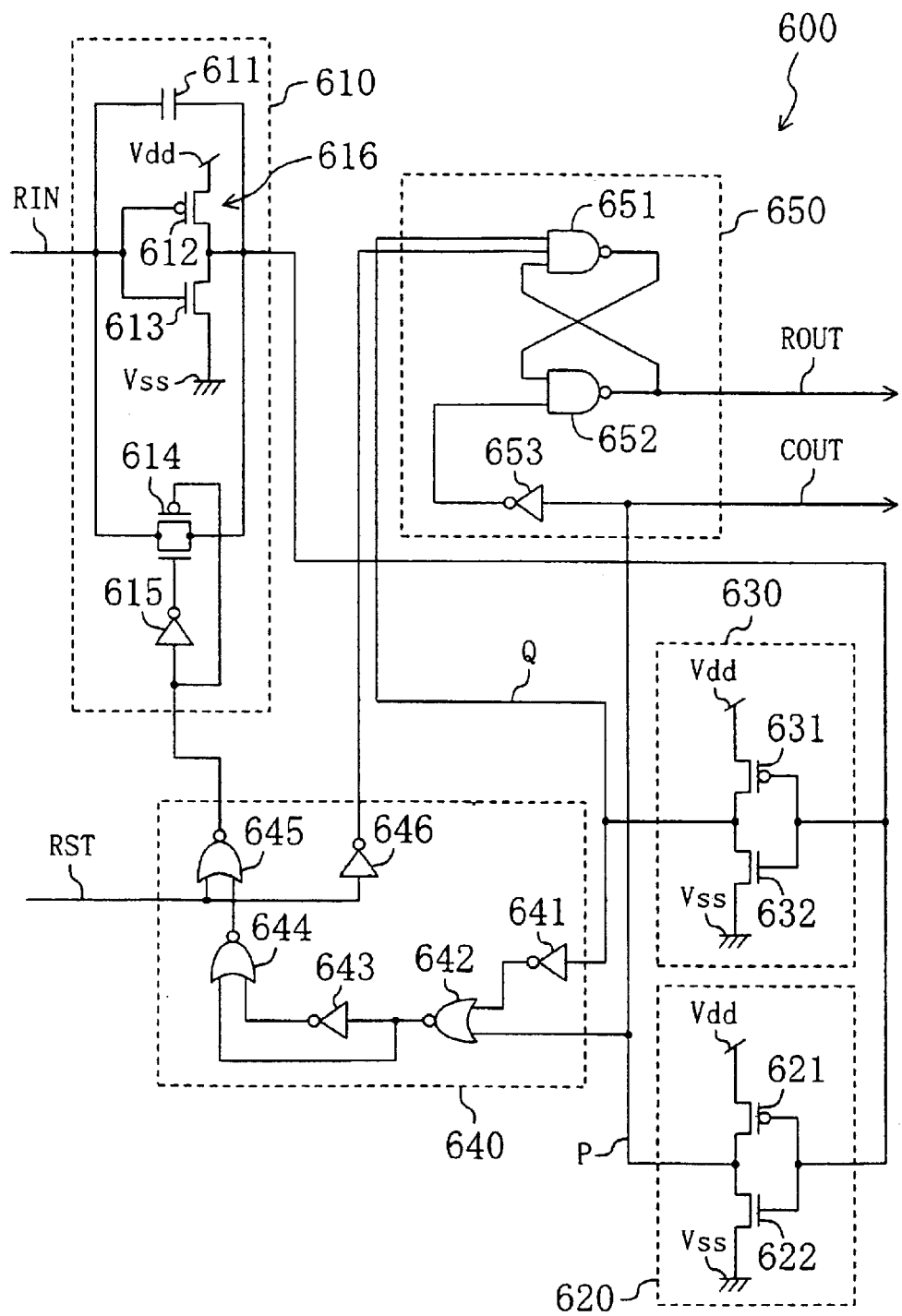
FIG. 10 is a circuit diagram illustrating the internal configuration of the receiving circuit in FIG. 6.

FIG. 10 shows the internal configuration of the receiving circuit 600 in FIG. 8. The receiving circuit 600 in FIG. 10 includes an amplifier circuit 610, a first level circuit 620, a second level circuit 630, an equalizing control circuit 640, and a latch 650.

The amplifier circuit 610 includes a receiving capacitor 611, a p-channel MOS transistor 612, an n-channel MOS transistor 613, an equalizing switch 614 and an inverter 615. The p-channel MOS transistor 612 and the n-channel MOS transistor 613 are inserted between the Vdd power line and Vss power line and constitute a CMOS inverter 616 for amplifying a voltage change in the input terminal RIN, i.e., a small voltage change in the signal line 30. The receiving capacitor 611 and the equalizing switch 614 are inserted between the input terminal and the output terminal of the CMOS inverter 616. When the equalizing switch 614 is turned on, each voltage of the signal line 30 and the input terminal and the output terminal of the CMOS inverter 616 is set to a predetermined equalized voltage Veq. Herein, Veq is a voltage determined depending on the input/output characteristics of the CMOS inverter 616. When the equalizing switch 614 is turned off, the operation of the CMOS inverter 616 for amplifying a small voltage change in the signal line 30 is allowed, so that the receiving capacitor 611 is charged and discharged.

The first level circuit 620 is a circuit for supplying a first detection signal (positive logic) P when a small positive voltage change in the signal line 30 is detected. This circuit includes a p-channel MOS transistor 621 and an n-channel MOS transistor 622 that are inserted between the Vdd power line and the Vss power line. The inverter constituted by these transistors 621 and 622 has a logic threshold voltage Vthl that is lower than the equalized voltage Veq, and detects a negative voltage change in the output terminal of the CMOS inverter 616, so that a small positive voltage change in the signal line 30 is detected.

The second level circuit 630 is a circuit for supplying a second detection signal (negative logic) Q when a small negative voltage change in the signal line 30 is detected. This circuit includes a p-channel MOS transistor 631 and an n-channel MOS transistor 632 that are inserted between the Vdd power line and the Vss power line. The inverter constituted by these transistors 631 and 632 has a logic threshold voltage Vthh that is higher than the equalized voltage Veg, and detects a positive voltage change in the output terminal of the CMOS inverter 616, so that a small negative voltage change in the signal line 30 is detected.

The first and second level circuits 620 and 630 can be constituted based on the configuration of the CMOS inverter 616 with a modification, for example, of the gate width of the p-channel MOS transistor 612 and the n-channel MOS transistor 613 to change the current gain coefficient.

The latch 650 is a so-called RS latch, which is set and reset in accordance with the first and second detection signals (P signal and Q signal) so that an output clock signal corresponding to the input clock (CLK) signal is supplied to the output terminal ROUT. This latch includes two NAND gates 651 and 652 and an inverter 653. In the example shown in FIG. 10, an output ROUT is set in response to the rise transition of the P signal, and the output ROUT is reset in response to the fall transition of the Q signal. To the terminal COUT, the P signal is output as it is.

The equalizing control circuit 640 is a circuit for forcing the equalizing switch 614 to be on while an RST signal at a logic high level is input, the equalizing switch 614 to be on for a predetermined period after the P signal (positive logic) or the Q signal (negative logic) is supplied, and the equalizing switch 614 to be off for other periods. This circuit includes three inverters 641, 643 and 646, and three NOR gates 642, 644 and 645. This equalizing control circuit 640 is also a control circuit for resetting the output ROUT when a RST signal at a logic high level is input. The inverter 643 constitutes a-delay circuit for delaying an output form the NOR gate 642.

In the signal transmission circuit shown in FIGS. 8 to 10, a RST signal in a logic high level is input to each receiving circuit 600 at the time of an initial operation. In response to this, the equalizing switch 614 is forced to be on in each receiving circuit 600. As a result, the input terminal and the output terminal of the CMOS inverter 616 are short-circuited, and each voltage of the signal line 30 and the input terminal and the output terminal of the CMOS inverter 616 is set to a predetermined equalized voltage Veq. Since this voltage Veq (>Vthl) is regarded as a logic high level input in the first level circuit 620, the P signal is at a logic low level. On the other hand, since this voltage Veq (<Vthh) is regarded as a logic low level input in the second level circuit 630, the Q signal is at the logic high level. The output voltage from the latch 650, i.e., the voltage of the output terminal. ROUT, is initialized to the logic low level. Then, after the RST signal is lowered to the logic low level, transmission of clock signals is started. At this point, the equalizing switch 614 is off, and the latch 650 is holding the logic low level output.

First, the operation of each part when an input clock signal of the transmitting circuit 500 makes a transition from the logic low level to the logic high level will be described. When an input clock signal makes a rise transition, the output from the NAND gate 512 in the transition detection circuit 510 is turned to the logic low level so that the first transmitting switch 523 is on for a certain period. Therefore, a small positive voltage change in accordance with the voltage of the first transmitting capacitor 521 that has been precharged by that point of time occurs in the signal line 30. In other words, the voltage of the signal line 30 changes from Veq to Veq+$\Delta$V. Herein, $\Delta$V is a voltage magnitude smaller than the signal line voltage magnitude (Vdd/2) of the conventional example described above. The CMOS inverter 616 amplifies the small positive voltage change in the signal line 30 with a gain G (=−5 to −1000). The voltage of the output terminal of the CMOS inverter 616 changes from Veq toward Veq−G$\Delta$V. At this point, almost all charges supplied from the first transmitting capacitor 521 to the signal line 30 rapidly transfers to the receiving capacitor 611. The first level circuit 620 detects a negative voltage change in the output terminal of the CMOS inverter 616 and changes the P signal to the logic high level. The second level circuit 630 holds the Q signal at the logic high level. Therefore, the latch 650 changes the output terminal ROUT to the logic high level. In other words, the rise transition of an output clock signal occurs in response to the rise transition of the input clock signal. On the other hand, the equalizing control circuit 640 forces the equalizing switch 614 to be on for a certain period for preparing for the fall transition of the input clock signal.

As a result, the signal line 30 and the receiving circuit 600 go back to the initial states. However, the latch 650 is holding the logic high level output. On the other hand, in the transmitting circuit 500, the predischarge switch 532 sets the voltage of the Vss power line in the second transmitting capacitor 531.

Next, the operations of each part when an input clock signal of the transmitting circuit 500 makes a transition from the logic high level to the logic low level will be described. When an input clock signal makes a fall transition, the output from the NOR gate 513 in the transition detection circuit 510 is turned to the logic high level so that the second transmitting switch 533 is on for a certain period. Therefore, a small negative voltage change in accordance with the voltage of the second transmitting capacitor 531 that has been precharged by that point of time occurs in the signal line 30. In other words, the voltage of the signal line 30 changes from Veq to Veq−ΔV. The CMOS inverter 616 amplifies the small negative voltage change in the signal line 30 with a gain G. The voltage of the output terminal of the CMOS inverter 616 rapidly changes from Veq toward Veq+GΔV. The second level circuit 630 detects a positive voltage change in the output terminal of the CMOS inverter 616 and changes the Q signal to the logic low level. The first level circuit 620 holds the P signal at the logic low level. Therefore, the latch 650 changes the output terminal ROUT to the logic low level. In other words, the fall transition of an output clock signal occurs in response to the fall transition of the input clock signal. On the other hand, the equalizing control circuit 640 forces the equalizing switch 614 to be on for a certain period for preparing for the rise transition of the input clock signal. As a result, the signal line 30 and the receiving circuit 600 go back to the initial states. However, the latch 650 is holding the logic low level output. On the other hand, in the transmitting circuit 500, the precharge switch 522 sets the voltage of the Vdd power line in the first transmitting capacitor 521. Thereafter, the same operation is repeated to achieve signal transmission.

As described above, according to the signal transmission circuit shown in FIGS. 8 to 10, an input clock signal is converted to a signal with a small amplitude on the signal line 30. Therefore, this signal transmission provides the same effect of high speed transmission, low power consumption and the like as in the case of FIG. 1. A clock signal also can be distributed from any one of the circuit blocks BK61, BK62 and BK63 to another circuit block in the same manner. In order to reduce the influence of power source noise and crosstalk, it is preferable that the asynchronous transmitting circuit 500 and receiving circuit 600 are provided in the vicinity of the peripheries of each circuit block. The asynchronous configuration shown in FIGS. 8 to 10 can be used for transmission of digital signals other than the clock signals.

Figure 11:
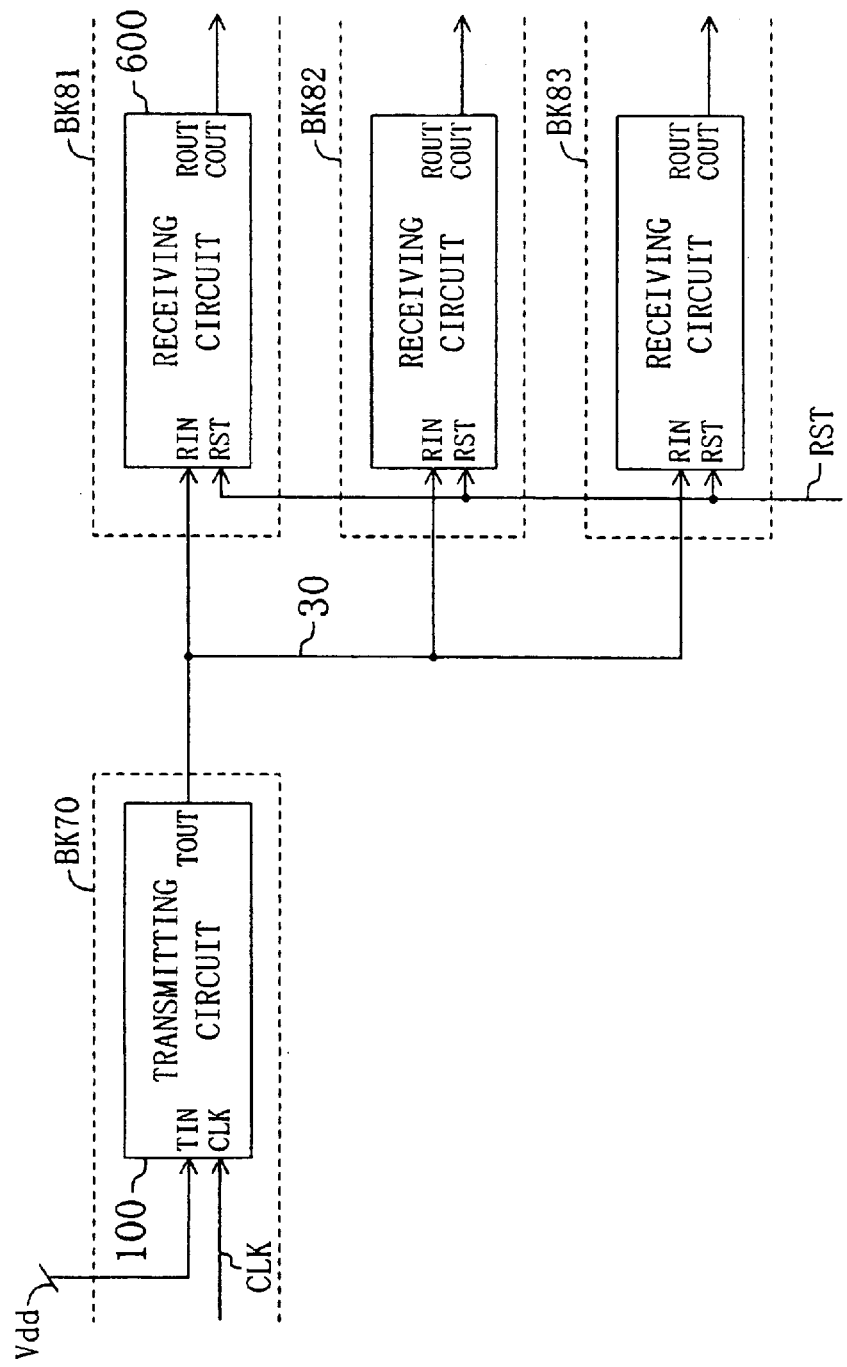
FIG. 11 is a block diagram illustrating another example of the configuration of an asynchronous signal transmission circuit of the present invention.

FIG. 11 shows another example of the configuration of an asynchronous signal transmission circuit according to the present invention. The signal transmission circuit in FIG. 11 is a signal transmission circuit for transmitting and distributing a clock (CLK) signal from a first circuit block BK70 to each of a second circuit block group BK81, BK82, and BK83 via a common signal line 30. The first circuit block BK70 includes the transmitting circuit 100 shown in FIG. 1. Each of the second circuit block group BK81, BK82, and BK83 includes the receiving circuit 600 shown in FIG. 10. The input terminal TIN of the transmitting circuit 100 in BK70 is connected to the Vdd power line. Each output clock signal in BK81, BK82, and BK83 is obtained from the COUT terminal.

In the signal transmission circuit shown in FIG. 11, a RST signal at a logic high level is input to each receiving circuit 600 at the time of an initial operation. In response to this, the equalizing switch 614 is forced to be on in each receiving circuit 600. As a result, the input terminal and the output terminal of the CMOS inverter 616 are short-circuited, and each voltage of the signal line 30 and the input terminal and the output terminal of the CMOS inverter 616 is set to a predetermined equalized voltage Veq. Since this voltage Veg (>Vthl) is regarded as a logic high level input in the first level circuit 620, the P signal, i.e., the output voltage from the COUT terminal is turned to a logic low level. Then, after the RST signal is lowered to the logic low level, transmission of a clock signal is started. At this point, the equalizing switch 614 is off, and the COUT terminal is holding the logic low level output.

On the other hand, the voltage of the input terminal TIN of the transmitting circuit 100 is constantly fixed to the logic high voltage (Vdd). Therefore, for each transmission period (a period of CLK=L), the voltage of the signal line 30 changes from Veq to Veq+ΔV. Herein, ΔV is a voltage magnitude smaller than the signal line voltage magnitude (Vdd/2) of the conventional example described above. This voltage change in the signal line 30 appears as a change from Veq to Veq−GΔV at the output terminal of the CMOS inverter 616 (see FIG. 10) in the receiving circuit 600 in FIG. 11. Therefore, the first level circuit 620 detects a negative voltage change in the output terminal of the CMOS inverter 616 so as to change the P signal to the logic high level. In other words, the rise transition of the output clock signal from the COUT terminal occurs in response to the fall transition of the input clock signal. On the other hand, the equalizing control circuit 640 forces the equalizing switch 614 to be on for a certain period for preparing for the next fall transition of the input clock signal. As a result, the signal line 30 and the receiving circuit 600 go back to the initial states. Thus, the fall transition of the output clock signal from the COUT terminal can be obtained.

As described above, also the signal transmission circuit of FIG. 11 provides the same effect of high speed transmission, low power consumption and the like as in the case of FIG. 1, because an input clock signal is converted to a signal with a small amplitude on the signal line 30. The voltage of the input terminal TIN of the transmitting circuit 100 is fixed to the logic low voltage (Vss), and the Q signal of the second level circuit 630 in the receiving circuit 600 or an inverted signal thereof can be output from the COUT terminal.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A signal transmission circuit for transmitting a digital signal from a first circuit block to a second circuit block via a signal line in synchronization with a clock signal that repeats a first logic level indicating a preparation period and a second logic level indicating a transmission period, the first circuit block comprising a transmitting circuit including:

a transmitting capacitor;

an input switch for supplying an input digital signal to the transmitting capacitor for each preparation period so as to set a voltage in accordance with a logic level of said input digital signal in the transmitting capacitor at each preparation period; and a transmitting switch for connecting the transmitting capacitor to the signal line for each transmission period so as to generate a small voltage change in the signal line at each transmission period, the voltage change being in accordance with a voltage of the transmitting capacitor that is set during a preceding preparation period, the second circuit block comprising a receiving circuit including:

an inverter connected to the signal line;

an equalizing switch for short-circuiting an input terminal and an output terminal of the inverter so as to set a voltage of the signal line to a predetermined voltage at each preparation period; and a latch for supplying an output digital signal obtained by performing logic amplification of a voltage of the output terminal of the inverter at each transmission period.

2. A signal transmission circuit for transmitting a digital signal from a first circuit block to a second circuit block via a signal line in synchronization with a clock signal that repeats a first logic level indicating a preparation period and a second logic level indicating a transmission period, the first circuit block comprising a transmitting circuit including:

a transmitting capacitor;

an input switch for supplying an input digital signal to the transmitting capacitor for each preparation period so as to set a voltage in accordance with a logic level of said input digital signal in the transmitting capacitor at each preparation period; and a transmitting switch for connecting the transmitting capacitor to the signal line for each transmission period so as to generate a small voltage change in the signal line at each transmission period, the voltage change being in accordance with a voltage of the transmitting capacitor that is set during a preceding preparation period, the second circuit block comprising a receiving circuit including:

an inverter connected to the signal line;

a receiving capacitor inserted between an input terminal and an output terminal of the inverter, an equalizing switch for short-circuiting the input terminal and the output terminal of the inverter so as to set a voltage of the receiving capacitor to a predetermined voltage at each preparation period; and a latch for supplying an output digital signal obtained by performing logic amplification of a voltage of the output terminal of the inverter at each transmission period.

3. A signal transmission circuit for transmitting a digital signal from a first circuit block to a second circuit block via a signal line in synchronization with a clock signal that repeats a first logic level indicating a preparation period and a second logic level indicating a transmission period, the first circuit block comprising a transmitting circuit including:

a transmitting capacitor;

an input switch for supplying an input digital signal to the transmitting capacitor for each preparation period so as to set a voltage in accordance with a logic level of said input digital signal in the transmitting capacitor at each preparation period; and a transmitting switch for connecting the transmitting capacitor to the signal line for each transmission period so as to generate a small voltage change in the signal line at each transmission period, the voltage change being in accordance with a voltage of the transmitting capacitor that is set during a preceding preparation period, the second circuit block comprising a receiving circuit including:

an inverter connected to the signal line;

a receiving capacitor inserted between an input terminal and an output terminal of the inverter;

an equalizing switch for short-circuiting the input terminal and the output terminal of the inverter so as to set a voltage of the signal line to a predetermined voltage at each preparation period; and a latch for holding an output digital signal obtained during a preceding transmission period at each preparation period.

4. A signal transmission circuit for transmitting a digital signal from a first circuit block to a second circuit block via a signal line in synchronization with a clock signal that repeats a first logic level indicating a preparation period and a second logic level indicating a transmission period, the first circuit block comprising a transmitting circuit including:

a transmitting capacitor;

an input switch for supplying an input digital signal to the transmitting capacitor for each preparation period so as to set a voltage in accordance with a logic level of said input digital signal in the transmitting capacitor at each preparation period; and a transmitting switch for connecting the transmitting capacitor to the signal line for each transmission period so as to generate a small voltage change in the signal line at each transmission period, the voltage change being in accordance with a voltage of the transmitting capacitor that is set during a preceding preparation period, the second circuit block comprising a receiving circuit including:

an inverter connected to the signal line;

a receiving capacitor inserted between an input terminal and an output terminal of the inverter;

an equalizing switch for short-circuiting the input terminal and the output terminal of the inverter so as to set a voltage of the signal line to a predetermined voltage at each preparation period; and a latch for supplying an output digital signal obtained by performing logic amplification of a voltage of the output terminal of the inverter for each transmission period and holding the output digital signal obtained during a preceding transmission period for each preparation period.

5. A signal transmission circuit for transmitting a digital signal from a first circuit block to a second circuit block via a signal line in synchronization with a clock signal that repeats a first logic level indicating a preparation period and a second logic level indicating a transmission period, the first circuit block comprising a transmitting circuit including:

a transmitting capacitor;

an input switch designed to be on to supply an input digital signal to the transmitting capacitor for each preparation period so as to set a voltage in accordance with a logic level of the input digital signal in the transmitting capacitor at each preparation period, and to be off for each transmission period; and a transmitting switch designed to be on to connect the transmitting capacitor to the signal line for each transmission period so as to generate a small voltage change in the signal line at each transmission period, the voltage change being in accordance with a voltage of the transmitting capacitor that is set during a preceding preparation period, and to be off for each preparation period, the second circuit block comprising a receiving circuit including:

an inverter connected to the signal line;

a receiving capacitor inserted between an input terminal and an output terminal of the inverter;

an equalizing switch designed to be on to short-circuit the input terminal and the output terminal of the inverter for each preparation period so as to set each voltage of the signal line and the input terminal and the output terminal of the inverter to a predetermined equalized voltage at each preparation period, and to be off to allow an operation of the inverter for amplifying a small voltage change in the signal line for each transmission period so as to charge and discharge the receiving capacitor, and a latch for supplying an output digital signal obtained by performing logic amplification of a voltage of the output terminal of the inverter for each transmission period and holding the output digital signal obtained during a preceding transmission period for each preparation period.

6. The signal transmission circuit according to claim 5, further comprising a cut-off switch for separating the inverter from a power line after the setting of the equalized voltage is completed at each preparation period.

7. The signal transmission circuit according to claim 5, further comprising a cut-off switch for separating the inverter from a power line after a voltage of the output terminal of the inverter is established at each transmission period.

8. A signal transmission circuit for transmitting a digital signal from a circuit block of a first circuit block group to a second circuit block via a common signal line in synchronization with a clock signal that repeats a first logic level indicating a preparation period and a second logic level indicating a transmission period, each circuit block of the first circuit block group comprising a transmitting circuit including:

a transmitting capacitor;

an input switch designed to be on to supply an input digital signal to the transmitting capacitor for each preparation period so as to set a voltage in accordance with a logic level of the input digital signal in the transmitting capacitor at preparation period, and to be off for each transmission period;

a transmitting switch designed to be on to connect the transmitting capacitor to the signal line for each transmission period so as to generate a small voltage change in the signal line at transmission period, the voltage change being in accordance with a voltage of the transmitting capacitor that is set during a preceding preparation period, and to be off for each preparation period; and a logic circuit for changing each state of the input switch and the transmitting switch in response to the clock signal when a corresponding selection signal is activated, and for fixing each state of the input switch and the transmitting switch when the selection signal is non-activated, the second circuit block comprising a receiving circuit including:

an inverter connected to the signal line;

a receiving capacitor inserted between an input terminal and an output terminal of the inverter, an equalizing switch designed to be on to short-circuit the input terminal and the output terminal of the inverter for each preparation period so as to set each voltage of the signal line and the input terminal and the output terminal of the inverter to a predetermined equalized voltage at each preparation period, and to be off to allow an operation of the inverter for amplifying a small voltage change in the signal line for each transmission period so as to charge and discharge the receiving capacitor; and a latch for supplying an output digital signal obtained by performing logic amplification of a voltage of the output terminal of the inverter for each transmission period and holding the output digital signal obtained during a preceding transmission period for each preparation period.

9. A signal transmission circuit for transmitting a digital signal from a first circuit block to a circuit block of a second circuit block group via a common signal line in synchronization with a clock signal that repeats a first logic level indicating a preparation period and a second logic level indicating a transmission period, the first circuit block comprising a transmitting circuit including:

a transmitting capacitor;

an input switch designed to be on to supply an input digital signal to the transmitting capacitor for each preparation period so as to set a voltage in accordance with a logic level of the input digital signal in the transmitting capacitor at preparation period, and to be off for each transmission period; and a transmitting switch designed to be on to connect the transmitting capacitor to the signal line for each transmission period so as to generate a small voltage change in the signal line at transmission period, the voltage change being in accordance with a voltage of the transmitting capacitor that is set during a preceding preparation period, and to be off for each preparation period;

each circuit block of the second circuit block group comprising a receiving circuit including:

an inverter connected to the signal line;

a receiving capacitor inserted between an input terminal and an output terminal of the inverter;

an equalizing switch designed to be on to short-circuit the input terminal and the output terminal of the inverter for each preparation period so as to set each voltage of the signal line and the input terminal and the output terminal of the inverter to a predetermined equalized voltage at each preparation period, and to be off to allow an operation of the inverter for amplifying a small voltage change in the signal line for each transmission period so as to charge and discharge the receiving capacitor;

a latch for supplying an output digital signal obtained by performing logic amplification of a voltage of the output terminal of the inverter for each transmission period and holding the output digital signal obtained during a preceding transmission period for each preparation period; and a logic circuit for changing a state of the equalizing switch in response to the clock signal when a corresponding selection signal is activated, and for fixing the equalizing switch to be off when the selection signal is non-activated.

10. A signal transmission circuit for transmitting a logic operation result from a first circuit block group to a second circuit block via a common signal line in synchronization with a clock signal that repeats a first logic level indicating a preparation period and a second logic level indicating a transmission period, the logic operation result being based on a digital signal supplied to circuit blocks of the first circuit block group, each circuit block of the first circuit block group comprising a transmitting circuit including:

a transmitting capacitor;

an input switch designed to be on to supply a predetermined logic voltage to the transmitting capacitor for each preparation period so as to set the logic voltage in the transmitting capacitor at preparation period, and to be off for each transmission period;

a transmitting switch designed to be on to connect the transmitting capacitor to the signal line for each transmission period so as to generate a small voltage change in the signal line at transmission period, the voltage change being in accordance with a voltage of the transmitting capacitor that is set during a preceding preparation period, and to be off for each preparation period; and a logic circuit for changing each state of the input switch and the transmitting switch in response to the clock signal when a corresponding input digital signal is activated, and for fixing each state of the input switch and the transmitting switch when the input digital signal is non-activated, the second circuit block comprising a receiving circuit including:

an inverter connected to the signal line;

a receiving capacitor inserted between an input terminal and an output terminal of the inverter;

an equalizing switch designed to be on to short-circuit the input terminal and the output terminal of the inverter for each preparation period so as to set each voltage of the signal line and the input terminal and the output terminal of the inverter to a predetermined equalized voltage at each preparation period, and to be off to allow an operation of the inverter for amplifying a small voltage change in the signal line for each transmission period so as to charge and discharge the receiving capacitor; and a latch for amplifying a voltage of the output terminal of the inverter by performing logical determination with a logic threshold voltage different from the equalized voltage so that an output digital signal indicating the logic operation result is obtained for each transmission period and holding the output digital signal obtained during a preceding transmission period for each preparation period.

* * * * *